(12) United States Patent
Everhart et al.

(10) Patent No.: US 8,954,204 B2
(45) Date of Patent: Feb. 10, 2015

(54) COLLISION SENSOR, COLLISION SENSING SYSTEM, AND METHOD

(71) Applicant: General Motors LLC, Detroit, MI (US)

(72) Inventors: Charles A. Everhart, Canton, MI (US); Lawrence D. Cepuran, Northville, MI (US); Mark S. Frye, Grosse Pointe Woods, MI (US); Steven Swanson, Commerce Township, MI (US); Wahaj Ahmed, Dearborn, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/849,264

(22) Filed: Mar. 22, 2013

(65) Prior Publication Data

US 2014/0288727 A1    Sep. 25, 2014

(51) Int. Cl.
| | | |
|---|---|---|
| G05D 1/00 | (2006.01) | |
| G07C 5/00 | (2006.01) | |
| B60R 21/01 | (2006.01) | |
| B60N 2/00 | (2006.01) | |
| B60R 21/00 | (2006.01) | |

(52) U.S. Cl.
CPC . *G07C 5/00* (2013.01); *B60R 21/01* (2013.01); *B60N 2/002* (2013.01); *B60R 2021/002* (2013.01)
USPC .......... 701/1; 701/45; 701/46; 180/272; 280/735

(58) Field of Classification Search
CPC .......... G08B 1/08; G06F 19/00; B60N 2/002; B60R 2021/002; B60R 21/01; B60R 21/16
USPC .............. 701/1, 45, 46, 47; 180/272; 280/735
See application file for complete search history.

(56) References Cited

U.S. PATENT DOCUMENTS

| | | | |
|---|---|---|---|
| 5,613,564 A * | 3/1997 | Rhines | 169/61 |
| 5,950,973 A | 9/1999 | Verma | |
| 6,082,764 A * | 7/2000 | Seki et al. | 280/735 |
| 6,670,888 B2 | 12/2003 | Schmidt et al. | |
| 6,864,786 B2 | 3/2005 | Speckhart et al. | |
| 7,741,961 B1 | 6/2010 | Rafii et al. | |
| 8,214,148 B2 | 7/2012 | Anderson | |
| 8,825,274 B2 | 9/2014 | De Tommasi | |
| 2003/0016124 A1 | 1/2003 | Schmidt et al. | |
| 2004/0160315 A1 | 8/2004 | Speckhart et al. | |
| 2004/0172173 A1 | 9/2004 | Goto et al. | |
| 2006/0250229 A1 | 11/2006 | Cheng et al. | |
| 2008/0119962 A1 | 5/2008 | Voeller et al. | |
| 2010/0125404 A1 | 5/2010 | Anderson | |

(Continued)

OTHER PUBLICATIONS

USPTO, Office Action for U.S. Appl. No. 13/849,283, mailed Nov. 19, 2014.

*Primary Examiner* — Gertrude Arthur Jeanglaude
(74) *Attorney, Agent, or Firm* — Ingrassia Fisher & Lorenz, P.C.

(57) ABSTRACT

A collision sensor, a collision sensing system, and a method of mounting a collision sensor to a vehicle are disclosed herein. An embodiment of the collision sensor includes, but is not limited to, a processor and a three-axis accelerometer that is communicatively coupled with the processor. The three-axis accelerometer is configured to detect an acceleration experienced by a vehicle and to generate a signal indicative of the acceleration. The processor is configured to obtain the signal from the three-axis accelerometer and to determine when the vehicle has experienced a collision based, at least in part, on the signal.

20 Claims, 2 Drawing Sheets

(56) References Cited

U.S. PATENT DOCUMENTS

| | | |
|---|---|---|
| 2010/0295665 A1 | 11/2010 | Landau et al. |
| 2011/0006943 A1 | 1/2011 | Shaffer |
| 2012/0223833 A1* | 9/2012 | Thomas et al. .......... 340/539.12 |
| 2012/0330497 A1 | 12/2012 | De Tommasi |
| 2013/0084847 A1 | 4/2013 | Tibbitts et al. |
| 2013/0115933 A1 | 5/2013 | Owens et al. |
| 2014/0113619 A1 | 4/2014 | Tibbitts et al. |
| 2014/0253737 A1 | 9/2014 | Kempinski |

\* cited by examiner

COLLISION SENSOR, COLLISION SENSING SYSTEM, AND METHOD

TECHNICAL FIELD

The technical field generally relates to automobiles, and more particularly relates to a collision sensor for use with a vehicle, a collision sensing system for use with a vehicle, and a method of installing a collision sensor in a vehicle.

BACKGROUND

Many modern vehicles are equipped with collision sensors that serve a variety of purposes. For example, a collision sensor may be used to determine when a vehicle collision has occurred and to thereby assist in rescue operations. In this example, when a collision sensor determines that a vehicle collision has occurred, that determination may be used by the vehicle's telematics unit to initiate contact with external agencies such as a remotely located call center which may then establish voice communications with the vehicle occupant(s) and summon assistance.

Historically, telematics units have been embedded in the vehicle, meaning that they are mounted to the vehicle, and coupled with the vehicle's electronic systems during assembly of the vehicle by the automotive manufacturer. During installation, the telematics unit may be connected to the vehicle bus and through that connection, may be placed in communication with the vehicle's embedded collision sensors.

Aftermarket telematics units and other aftermarket electronic components configured for in-vehicle use (collectively, "devices") are now available in the market. These devices may be configured to provide many or all of the same services that have historically been provided by embedded telematics units. However, some of these devices may not have access to the vehicle bus and therefore would not have access to the vehicle's collision sensors. Accordingly, some of these devices have been equipped with collision sensors of their own. However, such collision sensors are configured to detect acceleration in only two directions, i.e., along an X-axis and along a Y-axis with respect to the device. While such collision sensors have been adequate, there is room for improvement.

SUMMARY

A collision sensor, a collision sensing system, and a method of installing a collision sensor are disclosed herein.

In a first, non-limiting embodiment, the collision sensor includes, but is not limited to, a processor and a three-axis accelerometer that is communicatively coupled with the processor. The three-axis accelerometer is configured to detect an acceleration experienced by a vehicle and to generate a signal indicative of the acceleration. The processor is configured to obtain the signal from the three-axis accelerometer and to determine when the vehicle has experienced a collision based, at least in part, on the signal.

In another non-limiting embodiment, the collision sensing system includes, but is not limited to, a processor. The system further includes, but is not limited to, a three-axis accelerometer that is communicatively coupled with the processor. The three-axis accelerometer is configured to detect an acceleration experienced by a vehicle and to generate a signal indicative of the acceleration. The system still further includes, but is not limited to, a device that is communicatively coupled with the processor. The processor is configured to obtain the signal from the three-axis accelerometer, to determine when the vehicle has experienced a collision based, at least in part, on the signal, to generate a second signal indicative of the occurrence of the collision when the processor determines that the collision has occurred, and to provide the second signal to the device.

In a third non-limiting embodiment, a method for mounting a collision sensor to a vehicle is disclosed, the collision sensor having a three-axis accelerometer. The method includes, but is not limited to, the steps of positioning the vehicle on a substantially level surface, mounting the collision sensor to the vehicle, and calibrating the collision sensor while the vehicle is positioned on the substantially level surface.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
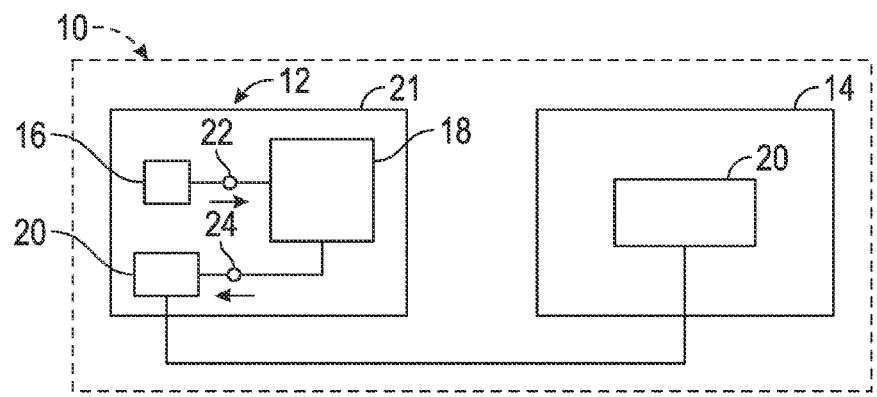
FIG. 1 is a schematic view illustrating a non-limiting example of a collision sensing system including a non-limiting example of a collision sensor in accordance the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In instances where identical or substantially identical components are used in different examples, such components will be given the same reference numeral.

A collision sensor, a collision sensing system, and a method of installing the collision sensor in a vehicle are disclosed herein. In a non-limiting example, the collision sensor includes a three-axis accelerometer that is configured to detect acceleration in three orthogonal directions, i.e., in a first direction along an X-axis, in a second direction along a Y-axis, and in a third direction along a Z-axis. Three-axis accelerometers are known in the art. An exemplary three-axis accelerometer is manufactured by ST Microelectronics under the model number LIS3DH.

By sensing acceleration in three orthogonal directions instead of the two orthogonal directions of conventional accelerometers (i.e., along an X-axis and a Y-axis), the collision sensor disclosed herein can be mounted to substantially any surface of the interior of the vehicle regardless of the angle of such surface. This is because the ability to measure acceleration in three orthogonal directions allows the collision sensor to self-calibrate, i.e., to correlate the acceleration measured along the three orthogonal axes with a horizontal orientation of the vehicle when the vehicle is positioned on a horizontal surface regardless of the mounting angle of the collision sensor. This ability of the collision sensor to self-calibrate provides the advantage of allowing the collision sensor to be installed on a variety of makes and models of vehicles in which the mounting surfaces have orientations that vary widely. This eliminates some precise installation limitations required of some prior art sensors, making installation easier, less technical, and available on a wider variety of vehicles. Another advantage is that the sensor package can be smaller because potentially complex mounting brackets and/or housing structures required to keep some prior art sensors in proper alignment may be eliminated. With this invention, sensors may be designed allowing installation by the purchaser or vehicle owner rather than requiring installation by a trained service technician.

In addition, by sensing acceleration in three orthogonal directions instead of the two orthogonal directions of conventional accelerometers allows, the effects of geography (e.g., hills, mountains, etc.) topography (e.g. bumps, dips, pot holes, etc.), and mounting angles (e.g., a steeply raked windshield or steeply raked interior vehicle surface) can be taken into consideration and the accelerations acting along the longitudinal and lateral axis of the vehicle can be calculated with relative accuracy. A collision sensor that utilizes a three-axis accelerometer has an advantage over a conventional collision sensor that utilizes at two-axis accelerometer because a conventional two-axis accelerometer, when mounted to a steeply raked surface in the vehicle will not be aligned with the vehicle's X-axis and/or the vehicle's Y-axis and may therefore only measure a portion of the vehicle's X-axis acceleration and Y-axis acceleration during a vehicle collision.

In the above described non-limiting example, the collision sensor further includes a processor. The processor may be configured to receive information from the three-axis accelerometer that is indicative of a vehicle's acceleration. The processor may further be configured to determine when the vehicle is experiencing a collision event based on the acceleration information provided by the three-axis accelerometer.

The ability of the three-axis accelerometer to accurately measure the longitudinal and lateral acceleration of the vehicle may provide advantages when determining whether a vehicle is experiencing a collision. Furthermore, the ability of the three-axis accelerometer to measure acceleration in three orthogonal directions may enable a collision sensor to determine when a vehicle is experiencing a rollover event.

When the above described collision sensor is coupled with a device that enables wireless communications, such as an aftermarket telematics unit, a smart phone, or any other device equipped with a wireless transmitter, a collision sensing system is formed which can not only detect a vehicle collision, but which can also alert external agencies as to the occurrence of the vehicle collision. The processor may be communicatively coupled with the device, or in the case where the collision sensor is integrated into the device, the processor may be communicatively coupled with the device's wireless transmitter. The processor may further be configured to control the device or the device's wireless transmitter to transmit a distress signal to an external agency to summon assistance.

A greater understanding of the teachings discussed above may be obtained through a review of the illustrations accompanying this application together with a review of the detailed description that follows.

Figure 2:
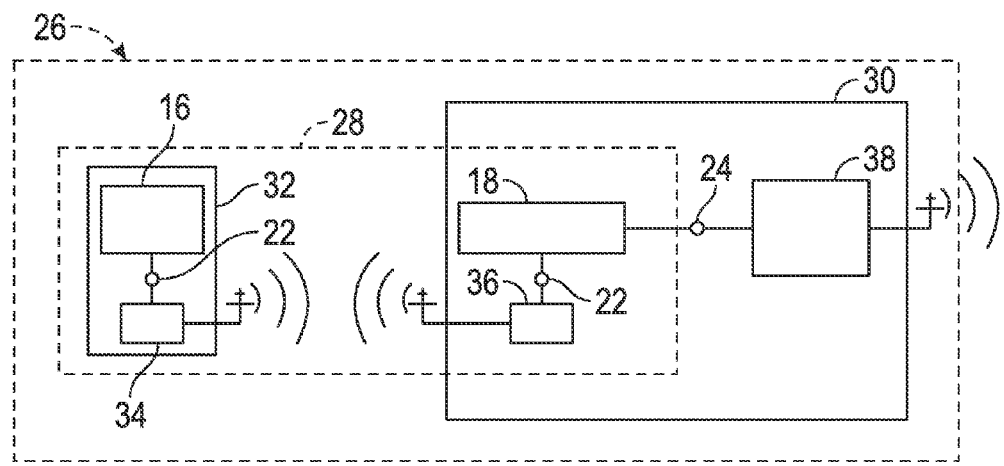
FIG. 2 is a schematic view illustrating another non-limiting example of a collision sensing system including a another non-limiting example of a collision sensor in accordance with the various teachings of the present disclosure.
Figure 3:
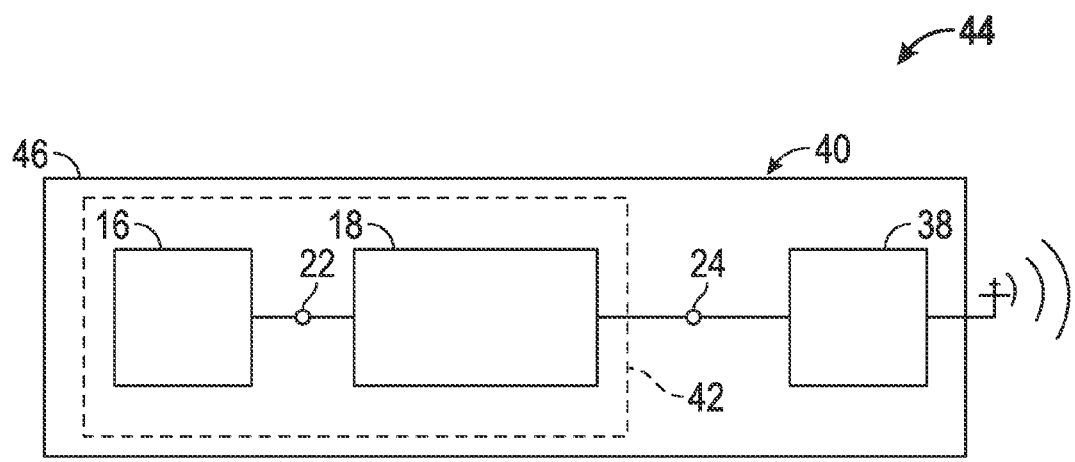
FIG. 3 is another non-limiting example of a collision sensing system including another non-limiting example of a collision sensor in accordance with the teachings of the present disclosure.

FIGS. 1-3 are schematic views illustrating non-limiting examples of collision sensing systems that are configured to detect a vehicle collision. It should be understood that the illustrated systems are merely exemplary in nature and further that many other configurations in addition to those depicted in FIGS. 1-3 are possible without departing from the teachings of the present disclosure.

FIG. 1 illustrates a collision sensing system 10 that includes an exemplary collision sensor 12 configured for use with an exemplary device 14. In the illustrated example, device 14 comprises a docking station to receive a communication component such as, but not limited to, a cellular telephone and/or a smart phone. In this embodiment, device 14 does not include a processor but rather creates a communicative link between collision sensor 12 and a processor embedded in the cellular telephone or smart phone. In other examples, device 14 may comprise a cellular telephone or a smart phone and collision sensor 12 may be communicatively directly coupled with such cellular telephone or smart phone without an intervening docking station.

Collision sensor 12 includes a three-axis accelerometer 16, a processor 18, and a communication coupler 20, all housed within a housing 21. Three-axis accelerometer 16 is communicatively coupled with processor 18, and processor 18 is communicatively coupled with communication coupler 20. Such couplings may be accomplished in any suitable manner including, but not limited to, wired or wireless connections. Such connections may be direct, as illustrated in FIG. 1, while in other embodiments, such connections may be indirect such as coupling over a bus or via one or more intervening components. In other examples, collision sensor 12 may include a greater or lesser number of components without departing from the teachings of the present disclosure.

Three-axis accelerometer 16 is configured to detect acceleration in three substantially orthogonal directions. Three-axis accelerometer 16 is further configured to generate a signal 22 that contains information indicative of the detected acceleration and to provide signal 22 to processor 18. In some examples, processor 18 may be configured to interrogate three-axis accelerometer to obtain signal 22.

Processor 18 may be any type of computer, controller, micro-controller, circuitry, chipset, computer system, or microprocessor that is configured to perform algorithms, to execute software applications, to execute sub-routines and/or to be loaded with and to execute any other type of computer program. Processor 18 may comprise a single processor or a plurality of processors acting in concert. In some embodiments, processor 18 may be dedicated for use exclusively with collision sensor 12 and/or collision sensing system 10 while in other embodiments processor 18 may be shared with other systems.

Processor 18 is configured (e.g., programmed) to receive signal 22 and to determine whether the vehicle in which collision sensing system 10 is installed is experiencing a collision. In some embodiments, processor 18 may be configured to utilize the information contained in signal 22 to calculate the acceleration experienced by the vehicle along the vehicle's longitudinal and lateral axes and to determine whether a collision is occurring or has occurred based on such calculated accelerations. When processor 18 determines that a collision is occurring or has occurred, processor 18 is further configured to generate a signal 24 containing information indicative of the occurrence of a collision. Processor 18 is further configured to transmit signal 24 to communication coupler 20 for delivery to device 14.

Communication coupler 20 comprises any suitable component that is configured to facilitate a wired communicative coupling between collision sensor 12 and device 14. For example, communication coupler 20 may comprise an electrical connector, a docking port or the like. In other cases where collision sensor 12 and device 14 are coupled via a wireless connection, communication coupler 20 may comprise a radio transceiver, an infrared transceiver, an ultrasonic transceiver or the like. As illustrated, device 14 is also equipped with communication coupler 20 to facilitate communicative coupling between collision sensor 12 and device 14.

When communication coupler 20 receives signal 24 from processor 18, communication coupler delivers signal 24 to device 14. In the illustrated example, device 14 comprises a docking station for another communication component. Accordingly, in the illustrated example depicted in FIG. 1, device 14 acts as a conduit and is configured to deliver signal 24 to the cellular telephone or smart phone that is docked with device 14 and in response, the cellular telephone or smart phone, upon receiving signal 24, may initiate communications with an external agency such as a remotely located call center.

One advantage of collision sensing system 10 is that collision sensor 12 is configured to be positioned remotely from device 14. This allows device 14 to have a smaller package size because it does not need to have a collision sensor incorporated within its housing. It further increases mounting flexibility by permitting device 14 to be mounted at a location that is most desired by the vehicle owner/operator while allowing collision sensor 12 to be mounted at locations where a system designer desires.

With reference to FIG. 2, another example of a collision sensing system 26 is illustrated. Collision sensing system 26 includes a collision sensor 28 and a device 30. With continuing reference to FIG. 1, collision sensor 28 is similar to collision sensor 12 in that it includes three-axis accelerometer 16 and processor 18. Collision sensor 28 differs from collision sensor 12 in the way that these two components are arranged. Whereas collision sensor 12 and three-axis accelerometer 16 are arranged together with processor 18 in a single housing/component, collision sensor 28 divides these elements among distinct components. In collision sensor 28, three-axis accelerometer 16 and processor 18 are physically separated and are associated with distinct components. As used herein, the term "associated", when used in conjunction with two or more components, should be understood to mean a grouping or packaging of such components wherein the "associated" components are part of the same assembly or are part of the same system or are otherwise related with one another. With collision sensor 28, three-axis accelerometer 16 is contained in a separate housing and can be positioned remotely from processor 18 while processor 18 is associated with device 30. Processor 18 may be configured to perform a wide variety of tasks associated with the functionality of device 30, one of which may be interfacing with three-axis accelerometer 16.

An exemplary device that utilizes collision sensing system 26 may include an aftermarket telematics unit loaded with appropriate software that allows it to communicatively couple with and interpret the information provided by three-axis accelerometer 16. Conventional aftermarket telematics units are disclosed in U.S. Publication No. 2011/0291823 published on Dec. 1, 2011, and also in U.S. Publication No. 2005/0273211 published on Dec. 8, 2005, both of which are hereby incorporated herein by reference. Another exemplary device that may utilize collision sensing system 26 may include a smart phone running an appropriate application that allows it to communicatively couple with and interpret the information provided by three-axis accelerometer 16.

With continuing reference to FIG. 2, three-axis accelerometer 16 is housed in a housing 32 together with a communication coupler 34 that enables communicative coupling between three-axis accelerometer 16 and processor 18. In the illustrated example, communication coupler 34 comprises a wireless transmitter that is configured to transmit a signal wirelessly to device 30. Wireless transmitters are well known in the art and any conventional wireless transmitter may be used with collision sensing system 26. Device 30 includes a communication coupler 36 which may comprise any conventional wireless receiver that is compatible with communication coupler 34. Communication coupler 36 is configured to deliver a signal received from communication coupler 34 to processor 18. In other examples, communication couplers 34 and 36 may be configured to facilitate a wired coupling between housing 32 and device 30, either instead of or in addition to a wireless coupling.

In the illustrated example, device 30 includes a wireless transceiver 38 comprising a cellular chipset. Cellular chipsets are well known in the art and are configured to enable device 30 to make cellular telephone calls. This capability enables device 30 to wirelessly communicate with external agencies, such as, but not limited to, a remotely located call center. In other examples, wireless transceiver 38 may comprise any other suitable wireless transceiver that facilitates communication between device 30 and external agencies.

In operation, when three-axis accelerometer 16 detects an acceleration, three-axis accelerometer 16 generates signal 22 containing information indicative of the detected acceleration and forwards signal 22 to communication coupler 34. Communication coupler 34 wirelessly transmits signal 22 to communication coupler 36 which, in turn, provides signal 22 to processor 18. Processor 18 utilizes the information contained in signal 22 to determine whether the acceleration detected by three-axis accelerometer 16 is indicative of a collision. If so, processor 18 generates signal 24 containing information indicative of the occurrence of a collision and provides signal 24 to wireless transceiver 38 for communication to external agencies to alert them to the occurrence of the collision. Such external agencies may then attempt to establish voice communication with the occupant(s) of the vehicle and/or to provide assistance to the occupant(s) of the vehicle.

With reference to FIG. 3, another example of a collision sensing system 40 is illustrated. Collision sensing system 40 includes a collision sensor 42 embedded within a device 44. In the illustrated example, device 44 may comprise an aftermarket telematics unit. In other examples, device 44 may comprise a smart phone.

Collision sensor 42 includes three-axis accelerometer 16 and processor 18. With continuing reference to FIGS. 1-2, unlike collision sensing systems 10 and 26 where the collision sensor (12, 28) or a portion of the collision sensor (housing 32) was configured to be positioned remotely from the device (14, 30), no portion of collision sensor 42 is configured to be positioned remotely from device 44. Rather, with collision sensing system 40, collision sensor 42 is housed within a housing 46 of device 44 such that collision sensor 42 and collision sensing system 40 are integrated into device 44.

Collision sensor 42 includes three-axis accelerometer 16 and processor 18. Processor 18 may be configured to perform not only tasks associated with the functionality of collision sensor 42, but also tasks associated with the functionality of device 44. Device 44 includes wireless transceiver 38 for communication with external agencies. In the example illustrated in FIG. 3, three-axis accelerometer 16, processor 18, and wireless transceiver 38 are each directly communicatively coupled with one another via a wired connection. In other examples, these components may be wirelessly communicatively coupled with one another via any suitable wireless technology.

In operation, when three-axis accelerometer 16 detects an acceleration, three-axis accelerometer 16 generates signal 22 containing information indicative of the detected acceleration and forwards signal 22 to processor 18. Processor 18 determines whether the acceleration detected by three-axis accelerometer 16 is indicative of a collision. If so, processor 18 generates signal 24 containing information indicative of the occurrence of a collision and provides signal 24 to wireless transceiver 38 for communication to external agencies to alert them to the occurrence of the collision. Such external agencies may then attempt to establish voice communication with the occupant(s) of the vehicle and/or to provide assistance to the occupant(s) of the vehicle.

Figure 4:
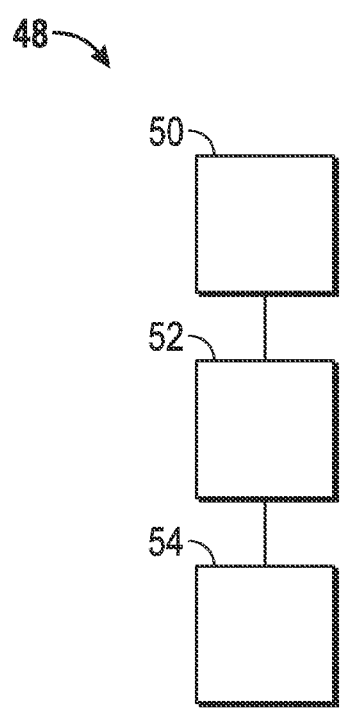
FIG. 4 is a flow diagram illustrating a non-limiting example of a method for mounting a collision sensor having a three-axis accelerometer to a vehicle.

FIG. 4 is a flow diagram illustrating a non-limiting example of a method 48 for mounting a collision sensor having a three-axis accelerometer to a vehicle. With continuing reference to FIGS. 1-3, method 48 is compatible with collision sensing systems 10, 26, and 40 utilizing collision sensors 12, 28, and 42, respectively, or with any other collision sensing system that utilizes a three-axis accelerometer.

At step 50, a vehicle is placed on a substantially level surface. In some examples, the vehicle will be an automobile, but it should be understood that the teachings of the present disclosure are not limited to automobiles. Rather, the teachings of the present disclosure are compatible with all types of vehicles including, but not limited to, watercraft, aircraft, and spacecraft.

At step 52, the collision sensor is mounted to the vehicle. Because the collision sensor utilizes a three-axis accelerometer, it may not be necessary to mount the collision sensor to a level surface. Rather, the collision sensor may be mounted to any desirable surface in the vehicle without regard to the rake of such surface.

At step 54, the collision sensor is calibrated. This step occurs while the vehicle is still positioned on the substantially level surface. During the calibration step, the processor executes algorithms that, among other things, associate the current acceleration readings of the three-axis accelerometer with a level surface. During this step, the only acceleration acting on the vehicle will be gravity. Accordingly, the processor will be able to determine the mounting angle of the collision sensor with respect to gravity and will associate that mounting angle with the vehicle being oriented at a level orientation. This provides the advantage of allowing the collision sensor to be mounted at substantially any angle within the vehicle therefore allows the sensor to be mounted on a wider variety of vehicles and in more flexible locations within the vehicle. Additionally, this "self-calibration" capability of the collision sensor enables a consumer to install the collision sensor him or herself without requiring the assistance of a trained service technician. After calibration has been completed, as long as the collision sensor remains mounted to the same surface, the processor will be able to accurately assess the accelerations acting along the vehicle's X-axis, Y-axis, and Z-axis. From that information, the processor will be able to accurately determine when and if the vehicle is experiencing a collision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A collision sensing system comprising:
a processor installed within a vehicle; and
a three-axis accelerometer installed within the vehicle and communicatively coupled with the processor, the three-axis accelerometer configured to detect an acceleration experienced by the vehicle and to generate a signal indicative of the acceleration,
wherein the processor is configured to obtain the signal from the three-axis accelerometer and to determine when the vehicle has experienced a collision based, at least in part, on the signal.

2. The collision sensing system of claim 1, wherein the processor and the three-axis accelerometer are communicatively coupled via a wireless connection.

3. The collision sensing system of claim 1, wherein the processor and the three-axis accelerometer are communicatively coupled via a wired connection.

4. The collision sensing system of claim 1, wherein the processor is associated with a device that is installed within the vehicle.

5. The collision sensing system of claim 4, wherein the three-axis accelerometer is configured to be positioned remotely from the device.

6. The collision sensing system of claim 1, wherein the processor is configured to generate a second signal indicative of the occurrence of a collision when the processor determines that a collision has occurred and is further configured to provide the second signal to a device.

7. A collision sensing system comprising:
a processor installed within a vehicle;
a three-axis accelerometer installed within the vehicle and communicatively coupled with the processor, the three-axis accelerometer configured to detect an acceleration experienced by the vehicle and to generate a signal indicative of the acceleration; and
a device installed within the vehicle and communicatively coupled with the processor,
wherein the processor is configured to obtain the signal from the three-axis accelerometer, to determine when the vehicle has experienced a collision based, at least in part, on the signal, to generate a second signal indicative of the occurrence of the collision when the processor determines that the collision has occurred, and to provide the second signal to the device.

8. The collision sensing system of claim 7, further comprising a housing disposed within the vehicle, wherein the communication unit and the processor are mounted within the housing.

9. The collision sensing system of claim 8, wherein the three-axis accelerometer is mounted within the housing.

10. The collision sensing system of claim 7, wherein the three-axis accelerometer is configured to be mounted remotely from at least one of the processor and the device.

11. The collision sensing system of claim 10, wherein the three-axis accelerometer is configured to be mounted remotely from both the processor and the device.

12. The collision sensing system of claim 7, wherein the device is configured to transmit a wireless distress signal in response to receiving the second signal from the processor.

13. The collision sensing system of claim 7, wherein the processor is configured to control the device to transmit a wireless distress signal in response to receiving the second signal from the processor.

14. The collision sensing system of claim 7, wherein the device includes a wireless transmitter installed within the vehicle.

15. The collision sensing system of claim 7, wherein the device comprises an aftermarket telematics unit installed within the vehicle, the aftermarket telematics unit including a cellular chipset.

16. The collision sensing system of claim 7, wherein the device comprises a docking station installed within the vehicle, the docking station configured to receive a smart phone.

17. The collision sensing system of claim 7, wherein the processor and the three-axis accelerometer are communicatively coupled via a wireless connection.

18. The collision sensor of claim 7, wherein the processor and the three-axis accelerometer are communicatively coupled via a wired connection.

19. A method for mounting a collision sensor to a vehicle, the collision sensor having a three-axis accelerometer, the method comprising the steps of:
   positioning the vehicle on a level surface;
   mounting the collision sensor to the vehicle;
   obtaining current acceleration readings from the three-axis accelerometer while the vehicle is positioned on the level surface; and
   calibrating the collision sensor while the vehicle is positioned on the level surface by associating the current acceleration readings of the three-axis accelerometer with the level surface.

20. The method of claim 19, wherein calibrating the collision sensor comprises calibration of the collision sensor by a purchaser of the collision sensor or by the vehicle owner.

\* \* \* \* \*